United States Patent [19]
Csoppenszky et al.

[11] Patent Number: 5,506,809
[45] Date of Patent: Apr. 9, 1996

[54] PREDICTIVE STATUS FLAG GENERATION IN A FIRST-IN FIRST-OUT (FIFO) MEMORY DEVICE METHOD AND APPARATUS

[75] Inventors: Michael A. Csoppenszky, Lake Oswego, Oreg.; Yoshikazu Nishiura, Tenri Nara, Japan

[73] Assignee: Sharp Kabushiki Kaisha, Japan

[21] Appl. No.: 268,170

[22] Filed: Jun. 29, 1994

[51] Int. Cl.$^6$ .............................. G11C 7/00; G11C 8/00
[52] U.S. Cl. .............. 365/221; 365/189.07; 365/230.01; 365/189.01; 365/233; 365/233.5; 365/236
[58] Field of Search .............................. 365/219, 189.05, 365/189.07, 189.01, 221, 233.5, 236, 233, 230.01

[56] References Cited

U.S. PATENT DOCUMENTS

| | | | |
|---|---|---|---|
| 4,833,651 | 5/1989 | Seltzer et al. | 365/189.07 |
| 4,864,543 | 9/1989 | Ward et al. | 365/221 |
| 4,875,196 | 10/1989 | Spaderna et al. | |
| 4,891,788 | 1/1990 | Kreifels | 365/189.01 |
| 5,084,841 | 1/1992 | Williams et al. | 365/189.07 |
| 5,206,817 | 4/1993 | McLure | 365/189.01 |
| 5,365,485 | 11/1994 | Ward et al. | 365/189.01 |
| 5,388,074 | 2/1995 | Buckenmaier | 365/189.05 |

FOREIGN PATENT DOCUMENTS 0049988  10/1981  European Pat. Off. .

OTHER PUBLICATIONS

FIFO Flag Timing: Marching to Two Different Drummers, Chuck Hastings, Sharp Microelectronics Inc., Date Unknown.
CMOS SyncFIFO, Military and Commercial Temperature Ranges, Integrated Device Technology, Inc., 1993.

*Primary Examiner*—Viet Q. Nguyen
*Attorney, Agent, or Firm*—Kolisch, Hartwell, Dickinson, McCormack & Heuser

[57] ABSTRACT

Method and apparatus are described for generating more accurate and timely FIFO status flags. Preferably, the asynchronous FIFO read and write pointers are conventionally compared with one another and the output of such comparison is glitch-suppressed. During such operation in accordance with the invented method and apparatus, prediction signals are used to precondition the status flag output latches so that they will provide the earliest possible accurate status reflecting asynchronous read and write clock activity. If a boundary condition is present—e.g. depending upon the next read or write clock activity, the FIFO's half full status flag may change where such change is impossible to predict because it is unknowable whether the next operation will be a read or a write or both—then an asynchronous state machine takes over from the prediction flag logic to ensure accurate and early preconditioning of the status flags' output latches. When no such boundary condition is present, the state machine is dormant and the prediction logic is active.

19 Claims, 9 Drawing Sheets

PREDICTIVE STATUS FLAG GENERATION IN A FIRST-IN FIRST-OUT (FIFO) MEMORY DEVICE METHOD AND APPARATUS

TECHNICAL FIELD

The present invention relates generally to generation of status flags in first-in, first-out (FIFO) memory devices. More particularly, the invention concerns a method and apparatus for generating status flags that use predictive asynchronous state machine logic, thereby reducing the status flags' access times and improving their dynamic accuracy.

BACKGROUND ART

Status flag combinatorial logic such as a comparator typically is used to gate asynchronous FIFO read and write operations to produce a flag indicating to the user the FIFO's status, e.g. empty, almost empty, half full, almost full and full. Often, such combinatorial logic is slow (imagine a ripple carry that must propagate through an n-stage adder, where n may be sixteen or greater) and has transient outputs that result from different (skewed) logic gate delays. Such transient outputs are referred to in the literature as glitches and their removal to avoid false status indications to the FIFO's user is referred to in the literature as glitch suppression. Unfortunately, glitch suppression, which is most often implemented as a delay that simply masks such gate delays, further delays the output of the flag generation logic so as to render it inaccurate to the extent of its lack of currency or immediacy.

The major disadvantages of prior art methods and apparatus for flag generation are outlined below. Since one must ensure that glitches from the comparison logic (constructed from purely combinatorial logic) do not become visible to the user, the result of the comparison must be passed through a glitch suppression block. This typically is implemented as a delay greater than the largest possible settling time of the comparison logic. If, for example, the comparator were realized with a ripple adder, the amount of delay that would have to be inserted would be greater than the time necessary for a carry signal to propagate through the entire chain of adders to set, for example, the most significant bit (MSB) of the sum to its correct value. Therefore, for the ever decreasing clock periods, those of skill will appreciate that a flag generated with this method can have quite large access times relative to the clock period of the device. These large access times would have serious implications on certain applications, such as using the status flags for block counting.

Since the set of status flags for a FIFO are by definition supposed to describe the amount of information currently present within the device, one can see that if the flags have large access times, the information delivered to the user may be stale (describe a historical rather than a present state of the FIFO) or simply inaccurate. Any application that requires knowledge of how much data is in the FIFO memory array at the current (i.e. immediate) point in time, would suffer under prior art and methods and apparatus for flag generation.

DISCLOSURE OF THE INVENTION

Briefly, the invention uses a combination of predictive, or look-ahead, logic and asynchronous state machine logic to minimize flag access times and to maximize flag dynamic accuracy. Thus, in applications such as block counting which require increasingly accurate knowledge of the present volume of data within a FIFO, the status flags may be made substantially more accurate and timely, even as FIFO pointer word lengths and read/write clock speeds increase (resulting in longer combinational logic delay and data skew).

In accordance with the invention, asynchronous FIFO read and write operations within the memory array are conventionally compared with one another and the output of such comparison is glitch-suppressed. During operations, however, in further accord with the invented method and apparatus, prediction logic is used to precondition the status flag output latches so that the flags will provide the earliest possible accurate status reflecting asynchronous read and write clock activity. If a boundary condition is present—for example, depending upon the next read or write clock activity, the FIFO's half full status flag may change where such change is impossible to predict because it is unknowable whether the next operation will be a read or a write operation—then an asynchronous state machine takes over from the prediction flag logic to ensure accurate and early preconditioning of the status flag output latches. When no such boundary condition is present, the state machine is dormant and prediction logic is active. The realized increase in dynamic flag resolution over prior art techniques, in accordance with the preferred method and apparatus of the invention, is nearly seven fold.

These and additional objects and advantages of the present invention will be more readily understood after consideration of the drawings and the detailed description of the preferred embodiment.

DETAILED DESCRIPTION OF THE PREFERRED EMBODIMENT AND BEST MODE OF CARRYING OUT THE INVENTION

Figure 1:
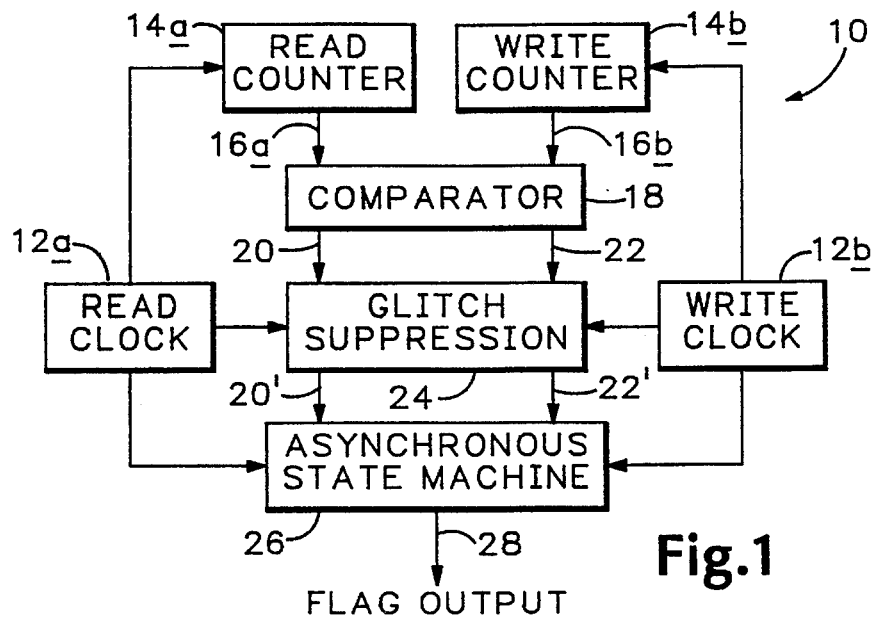
FIG. 1 is a block diagram illustrating a status flag generation apparatus constructed in accordance with the present invention.

Turning initially to FIG. 1, a representative architecture of the invented apparatus is provided in block diagram form, such architecture being indicated generally at 10. Architecture 10 represents a status flag-generation apparatus for use in a FIFO, a memory device which is configured to temporarily store serial data items, and to retrieve such data items in the order in which they were received. Data is stored in the FIFO during a write operation and retrieved from the FIFO during a read operation.

In accordance with conventional FIFO design, the invented apparatus is intended for use in connection with a FIFO wherein the read and write operations are independent of one another (i.e., the read and write operations are independently clocked). The apparatus includes read and write address pointers, each of which is (circularly) shifted synchronously with a corresponding read or write clock.

Those skilled in the art will appreciate that in a FIFO having enable inputs as well as clock inputs for both writing and reading, a write event is synchronized to the write clock input, and is made to occur by asserting the write enable input. Likewise, a read event is synchronized to the read clock input, and is made to occur by asserting the read enable input. In principle, the write clock and the read clock both may be free-running periodic waveforms derived from crystal oscillator frequency sources. However, most contemporary FIFOs avoid the use of any internal circuit techniques which would require that these clock signals must be periodic.

Conventional FIFOs commonly provide several status flags for informing a memory management unit (MMU) of a system coupled with the FIFO regarding the FIFO's relative state of fullness or emptiness. Typically, there are five such flags: full, almost-full, half full ("half" hereinafter), almost-empty and empty. The almost-full and almost-empty flags originated some years ago, as a semiconductor device adaptation of an interrupt-flag scheme used in certain minicomputers to indicate imminent process interruption.

Occasionally, there are not enough pins on a device to provide every FIFO feature desired by the semiconductor manufacturer and its customers. For example, the almost-full and the almost-empty flags might be combined by an OR gate function into an almost-full/empty flag signal that appears on a single output pin of the FIFO device. External logic then is used to distinguish the full and empty conditions one from another by examining the half flag (based upon the fact that a FIFO having a useful depth n, e.g. n≧2, when almost-empty must be less than half full).

Some FIFOs feature programmable almost-full and almost-empty flags, wherein typically large offset values are programmed into offset value registers associated with these two flags. These offset values define the almost-full condition in terms of the number of data items the FIFO is short of being full and the almost-empty condition in terms of the number of data items the FIFO differs from being empty.

With FIFOs, there are cases where the most recent event which has affected a flag value was synchronized with read and write clock signal timing that is asynchronous. In such cases, a status-representative signal may change in synchronism with a first clock signal, but may be read in synchronism with a second, different clock signal that is not synchronized with, or even related to the first clock signal. Thus, the FIFO's status flag is most unlikely always to meet the setup-time and hold-time requirements of downstream, operatively coupled and responsive, semiconductor devices.

Preliminarily, then, the FIFO fullness flags synchronization dilemma may be described as follows. Assume that subsystem A is synchronized to clock A and that subsystem B is synchronized to clock B. Subsystem A then synchronously is writing data destined for subsystem B in accordance with its clock A, into a FIFO the purpose of which is to order and manage the data such that subsystem B can synchronously read these same data out of the FIFO in accordance with its own clock B.

Whenever subsystem A writes one or more words, the FIFO suddenly can become full, almost-full or half full or it can suddenly cease to be almost-empty or empty. Similarly, whenever subsystem B reads a word, the FIFO suddenly can cease to be full, almost-full or half full. Thus, each flag signal can be affected for one state transition (i.e. status change) by what will be referred to herein as a write event and can be affected for the other state transition (i.e. status change) by what will be referred to herein as a read event. Accordingly, events which can cause the state of any of these so-called "fullness" flags to change can occur at either end of the FIFO.

The invention will be described in the context of a FIFO of depth n=1024, with independent read and write clocks. The write clock 12b, also identified as WCLK, clocks data into the FIFO. The read clock 12a, also identified as RCLK, clocks data out of the FIFO. WCLK and RCLK typically are completely independent and cycle at any desired rate compatible with the data-setup and hold time specifications of the FIFO and with the substantially reduced, e.g. approximately 4 nanosecond (ns), flag skew time of the present invention. Of course, they may be asymmetric and aperiodic, so long as they meet predetermined minimum clock high and clock low times.

The apparatus of the present invention thus includes separate read and write clocks 12a, 12b, the read clock 12a indexing the read pointer with each read clock pulse, and the write clock 12b indexing the write pointer with each write clock pulse. Read counter 14a indexes, e.g. increments, an address pointer 16a which is indicative of the address which will be read with the next read clock pulse. Write counter 14b indexes, e.g. increments, a write pointer 16b which is indicative of an address which will receive data upon the next write operation of the device. Either pointer may be considered to point to a FIFO memory location, i.e. each represents the corresponding next address (whether read or write) of the FIFO device.

Thus, address pointers 16a, 16b point into the FIFO memory array, pointer 16a pointing to the location of the data item that will be read out of the FIFO on the next rising edge of the read clock and pointer 16b pointing to the location in the FIFO memory array that will be written on the next rising edge of the write clock. The FIFO memory array is managed from an address pointer standpoint as a circular buffer so as to provide for effectively continuous indexing of the read and write pointers. Those of skill in the art will appreciate that the clocks may be low- or high-active, and may produce leading or trailing, rising or falling, edge-triggered results in FIFO pointer and status flag generation. The read and write clock signals that characterize FIFOs for which the invented method and apparatus are particularly useful are those that are asynchronously pulsed, i.e. where their active, or assertive, regions, or pulses, whether high- or low-going, have independently timed leading and/or trailing edges.

The address pointers are output to a comparator 18, which compares the read and write address pointers so as to determine a difference therebetween. It will be appreciated that the read pointer points to the location of the earliest-entered data in the FIFO and the write pointer points to the HFO location to which the next piece of data will be written. The difference (or distance) between the read and write pointer thus will be understood to indicate an address count, such count representing the quantitative content of the memory device. An address count of 0, for example, will indicate that the memory device is empty and an address count of n, e.g. 1024, will indicate that the memory device is full. Similarly, a half full memory device will have an address count of n/2+1, e.g. 513. The present invention provides for the accurate identification of a FIFO's address count so as to provide for the accurate generation of a status flag indicative of such count.

Comparator 18 relates the read and write address pointers to identify a difference therebetween, i.e. it determines the difference between the read and write pointers, and compares such a difference with predetermined criteria to predict a status condition of the FIFO memory device, i.e. to predict a change in a status condition of the FIFO, and produces a corresponding predicted status signal thereupon. Described herein will be such comparison generally in the context of the generation of a half full, or half flag which is indicative of a half full memory device. Nevertheless, those of skill in the art will appreciate that any pre-programmed or user-programmed address count or other criteria, within the spirit and scope of the invention, may provide the basis for comparison to produce useful FIFO status condition indicia. Thus an operator-defined address count ;might be the basis for such a comparison by the simple expedient of providing a user-programmable address count or difference register within apparatus 10.

It will be appreciated by those skilled in the art that such predefined criteria may include the relative emptiness, fullness or other useful data content indicia. In accordance with the preferred method and embodiment of the invention, such criteria include a transition value corresponding to an address count of the memory device that, in turn, denotes a predetermined status condition change, as will be described in detail below. (The illustrative example is a transition value, e.g. a present address count of 512 and a next address count of 513 where n=1024 denotes assertion of the FIFO's half full status flag. In such case, as will be seen, such change in status of the FIFO's half full flag is predicted when the address count of the memory device differs from transition value 512→513 by a predetermined amount such as one, i.e. when the address count is represented by a 511→512 transition.)

Comparator 18 relates the address count to predefined criteria to condition flag generation logic to change state with the next pulse of a predetermined one of the clocks. When the flag status is inactive, the comparator compares the address count with a predefined assertion predictor value, such value representing an address count which is one less than the address count at which the half full status flag is to become active. A similar assertion predictor value is provided for the almost full flag and for the full flag, both of which change status upon a transition of the write clock. Assertion of the almost empty flag, and of the empty flag, in contrast, occurs upon a transition or change of state of the read clock, and these flags in the preferred embodiment are associated with an assertion predictor value that is one greater than the address count at which a corresponding flag's status is to change.

As indicated in FIG. 1, the comparator 18 outputs an assertion predictor 20 and a de-assertion predictor 22. Assertion predictor serves as a status signal which indicates that a flag will change from inactive to active, e.g. from low to high. Such change may be indicated by an edge, or a transition from a low to high output level, or correspondingly from a high to a low output level, depending upon the choice of positive-true or negative-true logic. Similarly, the de-assertion predictor 22 indicates that a flag will change from an active to inactive, e.g. high to low.

As indicated, the assertion and de-assertion status signals are connected to glitch suppression circuitry 24 coupled with comparator 18, such circuitry being capable of suppressing transient predicted status signals produced thereby, in a manner which is described in detail below. A detailed representation of such circuitry is further illustrated in FIGS. 9A and 9B, to be discussed below. The glitch suppression circuity 24 produces glitch-free status signals which correspond to the assertion predictor and de-assertion predictor signals described above. FIG. 1 illustrates such signals at 20', 22', such signals corresponding to assertion predictor 20 and de-assertion predictor 22. The glitch-free signals are passed to an asynchronous state machine 26, which interprets such signals to direct a flag output 28 synchronously with a predetermined one of the clock signals, or asynchronously with both clock signals. For example, where a half full flag is to transition from an inactive to an active state, glitch-free status signal 20' will be active, glitch-free de-assertion status signal 22' will be low, and flag output 28 will transition from inactive to active status synchronously with the write clock. In contrast, where the half full flag output is to transition from active to inactive status, signal 20' will be low, signal 22' will be high, and the flag output will transition synchronously with read clock 12a. Transition of the almost full flag, in both directions, will be similar to that described with respect to the half full flag.

The almost empty flag will transition from inactive to active status synchronously with the read clock and will transition from active to inactive status synchronously with the write clock. The full flag will transition from inactive to active status with the write clock, and back to inactive status with the read clock, (although in this case the inactive status will be indicated on the next write clock). It will be noted that no prediction is necessary in full flag transition from active to inactive status inasmuch as the read operation is the only operation which may occur when the memory device is full. Similarly, an empty flag will transition from inactive to active status synchronously with the read clock, and back to inactive status with the write clock (inactive status will be indicated on the next read clock). The only operation which is allowed to occur when the memory device is empty is a write operation, and so there is no need for prediction of a transition from an active empty status flag to an inactive empty status flag.

Figure 2A:
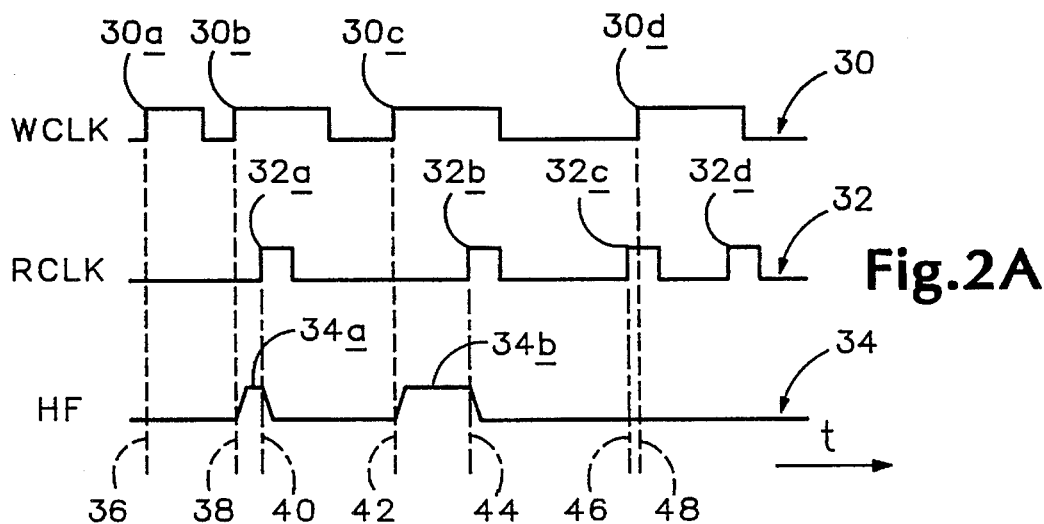
FIG. 2A depicts exemplary read and write clock signal waveforms, and a corresponding half full status flag output signal waveform of the apparatus depicted in FIG. 1.
Figure 2B:
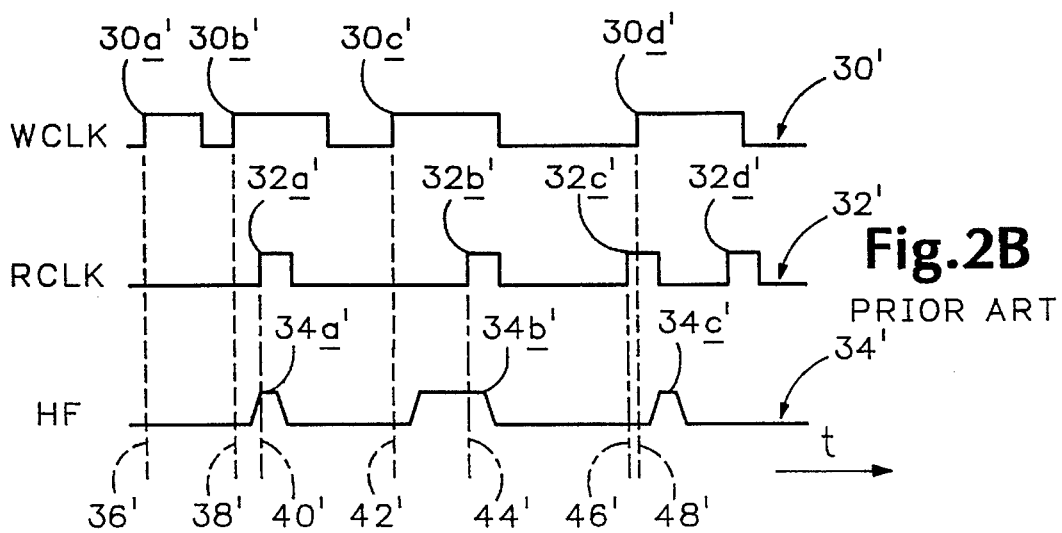
FIG. 2B depicts waveforms representative of read and write clock signals identical to those of FIG. 2A, with a corresponding half full status flag output signal waveform of an exemplary flag generation device of the prior art variety.

Referring now to FIGS. 2A and 2B, an illustrative comparison is made between the half-full status flag output of the invented apparatus and the half-full status flag output of an apparatus illustrative of the prior art. Toward this end, FIG. 2A shows a half full status flag output signal waveform 34 as it relates to a write clock signal waveform 30 (WCLK) and a read clock signal waveform 32 (RCLK). The FIFO array is initially considered at approximately the time of transition between active and inactive status of the status flag. FIG. 2B shows half full status flag output from a prior art FIFO flag generator wherein the read and write clocks are indicated by primed reference designators corresponding with those of FIG. 2A. The reader will note that the read and write clocks are identical in FIGS. 2A and 2B so as to make clear the difference between the invented apparatus and method (shown in FIG. 2A), and the prior art apparatus and method (shown in FIG. 2B).

Considering the signal waveform timing illustrated in FIG. 2A, those skilled in the art will appreciate that there is a minimum delay from a rising edge of RCLK to a rising edge of WCLK which will ensure that the FIFO's full flag will become accurate no later than the end of the current write cycle of the FIFO. Similarly, there is a minimum delay from a rising edge of WCLK to a rising edge of RCLK which will ensure that the FIFO's empty flag will become accurate no later than the end of the current read cycle of the FIFO. These design considerations influence the design goals and achievements embodied by the invented method and apparatus.

The importance of improving dynamic accuracy is shown graphically in FIGS. 2A and 2B, with the half full flag (HF) taken as an example. It will be appreciated that WCLK potentially causes the asynchronous half full flag to be asserted, and that RCLK potentially causes the flag to be de-asserted. Illustrative independent operations of such separate WCLK and RCLK clock signals are shown identically in FIGS. 2A and 2B. With the prior art shown in FIG. 2B, the HF flag is unavailable for access by the user until a time later than that of the invented method and apparatus the timing of which is illustrated in FIG. 2A. Also, a false positive indication of half-fullness (the third HF pulse from the left in FIG. 2B, which pulse is labelled $34c'$) is avoided with the invented method and apparatus the timing of which is illustrated in FIG. 2A. Thus, among the advantages of the present invention are shorter flag access times and fewer false-positive status flag indications.

Considering the half full status flag to transition from inactive to active status at an address count m, and assuming that the graph in FIG. 2A illustrates at $30a$, a write clock pulse which signifies a write operation which brings the FIFO's contents from m-2 data items to m-1 data items, it is to be noted that dashed line 36 represents the time t at which point an assertion prediction is made. With the next write clock pulse $30b$ (assuming no intermediate read clock pulse) the half full status flag changes to an active state under direction of the state machine. Such transition is signified by pulse $34a$ in FIG. 2A. As will be appreciated from the drawing, the illustrated flag is leading-edge-triggered, the half full flag beginning its transition to active status at the time indicated by the dashed line 38 which is synchronous with the write clock signal 30.

Upon a read operation, as indicated by pulse $32a$, the edge of which is indicated at 40, the half full flag will change from active to inactive status, the contents of the FIFO having been decremented by one. This decrement of the address count will be appreciated to correspond to an incremental change in the read address pointer, and correspondingly to a decrease in the difference between the read address pointer and the write address pointer. The next write clock pulse $30c$ again results in a change of the half full flag to active status, as indicated at $34b$, such status change occurring synchronously with the write clock.

Upon the occurrence of read clock pulse $32b$, the half full flag transitions to inactive status again as indicated at 44. The address count thus is again at m-1. With the next read clock pulse $32c$, the address count decreases to m-2, then increases again to m-1 upon write clock pulse $30d$. As indicated at 46 and 48, the read clock pulse precedes the write clock pulse. Read clock pulse $32d$ again decreases the address count to m-2. Half full flag assertion thus occurs at 38 and 42, and de-assertion occurs at 40 and 44.

In contrast, prior art memory devices have been characterized by excessive delay in assertion of the half full flag, such delay being made apparent by the delay in time between the memory device becoming half full which occurs at time 38', and the assertion of the half full flag $34a'$ which may not become active until after a subsequent read clock pulse $32a'$. This results in inaccurate half full status flag information. Similarly, where the read clock and write clock occur in very close timing relation with one another, it is possible that a half full status flag would become active as indicated at $34c'$ even when the FIFO has not become half full. As indicated, the read clock pulse which would index the read pointer may not be interpreted as quickly as the write clock pulse so as to give the appearance to the state machine of a momentary transition to half full status. This condition is obviated by the present invention by lookahead, pipelined prediction logic which decreases the delay of clock pulses that might produce status flag changes.

Figure 3:
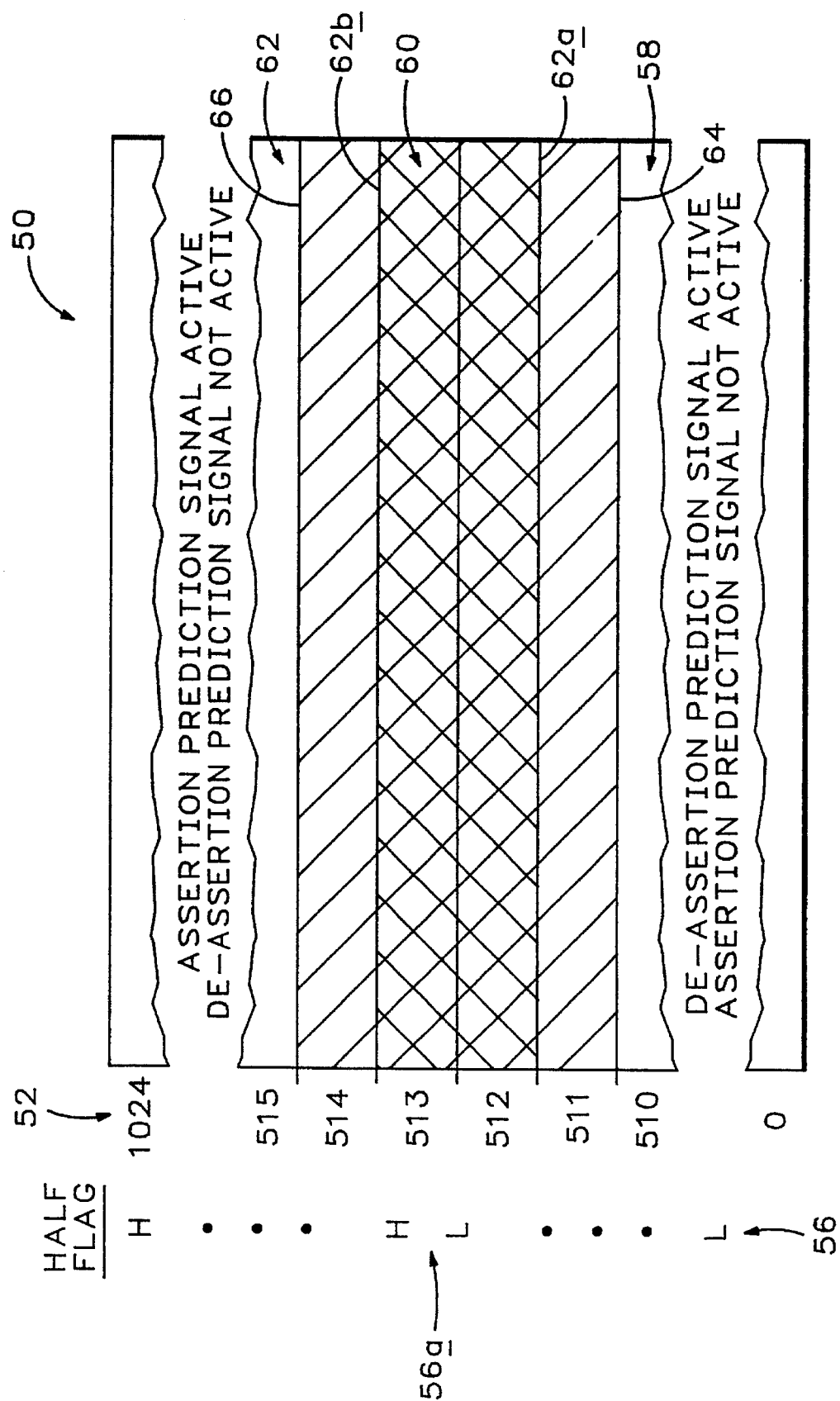
FIG. 3 is a simplified representation of addresses in a first-in first-out memory device (FIFO) along with an indication of the desired state of a half full status flag.

Turning now to FIG. 3, a representation of an actual FIFO memory capable of containing 1024 data items is shown at 50, along with the corresponding addresses 52 and the half full status flag 56. In FIG. 3, the half full status flag is indicated as being active high, such active state being indicated by an H. The inactive, or low, state is indicated by an L. As will be appreciated, the transition between high and low occurs generally in the area indicated at $56a$, such transition occurring upon a write operation which increases the content of the memory device from 512 data items to 513 data items.

Proceeding with a description of the assertion and de-assertion prediction signals as they relate to the address content, it will be appreciated that the half flag de-assertion prediction logic is always active when the address count is below 511, and is always inactive when the address count is above 514. Correspondingly, the half flag assertion prediction logic is always inactive when the address count is below 511, and is always active when the address count is above 514. As the address count increments, and specifically as the address count transitions from 511→512, the half flag assertion prediction signal transitions from inactive to active status so as to predict a change in half full flag status with the next write clock pulse.

The next write clock pulse, it will be appreciated, will index the address count from 512→513 (assuming there is no intervening read clock pulse). Once the assertion prediction signal has become active, as indicated at $62a$, the half full flag will be controlled completely by the asynchronous state machine. The assertion and de-assertion prediction signals therefore are not used. Control will remain with the state machine until the status count exits the shaded (crosshatched) region into a low-count region indicated fragmentarily at 58 or into a high-count region indicated fragmentarily at 62. Upon entry to such regions 58 or 62, which in the illustrated embodiment where n=1024 will be understood respectively to represent a transition from 516→515 or from 511→510, the assertion prediction signal and de-assertion prediction signals again control. Such state machine exit transition boundaries are indicated at 64 and 66.

For half full status flag de-assertion, it will be appreciated that the de-assertion prediction signal will transition from inactive to active upon a read clock pulse which decrements the address count from 514→513. Such transition is indicated at $62b$. Again, at such point, the status flag output is placed entirely under the asynchronous state machine control. Control remains with the state machine until the address count transitions from 514→515 or from 511→510. Those skilled in the art will appreciate that the shaded regions indicated by reverse-direction cross-hatching in FIG. 3 represent in the case of lower left to upper right lining the narrower region of interest in entering, or activating, the state machine, and represent in the case of upper left to lower right lining the broader region of interest in exiting, or inactivating, the state machine.

The main advantage or contribution of the present invention over current methods of status flag generation is much improved flag access times while simultaneously providing a significant increase in the dynamic accuracy of the flags. These advantages enable a user of a FIFO device more accurately to know how much data the FIFO contains. Given the fact that a FIFO may be shared by systems that operate with completely independent clock frequencies, the design of such flag logic to process these asynchronous transactions is not a trivial task. Conventional methods and apparatus for flag generation (discussed previously) avoid much of this complexity by sacrificing both flag access time and dynamic accuracy for simplicity.

Summarizing briefly, the present invention operates on the following principles. If, for example, the half flag should become asserted when the FIFO contains m elements, the comparator would activate its assertion prediction signal to the state machine when the FIFO contains m-1 data items. From the state machine's point of view, when the half flag's assertion predictor is activated, it knows that on the next WCLK (assuming an RCLK does not occur first) it should assert the half flag. The situation is symmetrical with de-assertion of the half flag (utilizing RCLK and the de-assertion predictor). The programmable almost empty flag, half flag, and programmable almost full flag all operate in this manner. The empty and full flags operate in a similar fashion, but generation of these two flags is greatly simplified. The empty and full flags both utilize only assertion prediction signals. De-assertion prediction is not required, since becoming not empty and not full only requires a WCLK event (with an empty FIFO) and an RCLK event (with a full FIFO) respectively.

FIG. 3 indicates in a more high-level way, how the invention works. In particular, the half flag is again taken as an example. For writing data into the FIFO (to assert the half full (HF) flag), entry is made into the (narrower) shaded region when the FIFO transitions from 511→512 data items (the half flag will becomes asserted upon a next write clock without an intervening read clock). This initial transition into the shaded region was caused by the half flag assertion prediction input to the state machine becoming active when 512 elements are contained with the FIFO. Once entry is made into the shaded region, the state of the flag is completely controlled by the state machine (prediction signals are no longer necessary or useful, because at the flag transition point prediction becomes impossible). There are now two methods of exiting the (broader) shaded region, one is a transition from 511→510 elements within the FIFO, the other is a transition from 514→515. The example just described assertion of the half flag, although de-assertion of the half flag is completely symmetrical. For deassertion, entry into the (narrower) shaded region would occur on a 514→513 transition (the half flag has just become de-asserted). The exit points are the same as the assertion case previously described.

To reiterate, the state machine is dormant, or asleep, until it is awakened by the activation of either the assertion or deassertion flag prediction signal. Once this occurs, the state machine knows that the flag may transition on the next rising clock edge (depending on what the other clock is doing during this period). If the flag transition occurs, entry has been made into the shaded region (shown in FIG. 3). In this region, the flag state is completely controlled by the state machine (independent of the flag prediction signals, since at a flag transition point prediction is not possible). When the shaded region is exited (as discussed previously), the state machine again is in a sleep mode until a flag prediction signal is activated.

Turning now to FIGS. 4A through 9, the apparatus of the invention made in accordance with a preferred detailed embodiment will be described. Those of skill in the art will appreciate that, in some cases, the logic sense of the signals is different between detailed logic diagrams in FIGS. 4A through 9 and corresponding signals illustrated in FIGS. 1 through 3, which in the interest of clarity treated all signals as being high-active. In aid of understanding the detailed logic diagrams, listed below are the signal names, or signatures, and a brief description of their significance:

| Signal | Description |
|---|---|
| comp_ef_out | glitch-free empty flag assertion predictor |
| comp_ef | raw empty flag assertion predictor (from counter) |
| comp_ff | raw full flag assertion predictor (from counter) |
| comp_ff_out | glitch-free full flag assertion predictor |
| comp_hf | raw half flag assertion predictor |
| comp_hf_out | glitch-free comp_hf |
| comp_hf_r | raw half flag de-assertion predictor |
| comp_hf_r_out | glitch-free comp_hf_r |
| comp_pae | raw almost empty assertion predictor |
| comp_pae_out | glitch-free comp_pae |
| comp_pae_r | raw almost empty de-assertion predictor |
| comp_pae_r_out | glitch-free almost empty de-assertion predictor |
| comp_paf | raw almost full flag assertion predictor |
| comp_paf_out | glitch-free comp_paf |
| comp_paf_r | raw almost full flag de-assertion predictor |
| comp_paf_r_out | glitch-free comp_paf_r |
| edge_rclk2 | active high pulse of sufficient duration reliably to set or reset flip-flop |
| edge_rclk2_n | active low pulse of sufficient duration reliably to set or reset flip-flop |
| edge_rclk4_n | active low pulse of duration greater than the generation of FLAG_rclk_n plus the setup time of flip-flop |
| edge_wclk2_n | active low pulse of sufficient duration reliably to set or reset flip-flop |
| edge_wclk4_n | active low pulse of duration greater than the generation of FLAG_wclk_n plus the setup time of flip-flop |
| ef_n | active low empty flag output |
| ff_n | active low full flag output |
| hf_sy_n | active low half flag output (sync to uwclk) |
| hf_n | active low half flag output (async) |
| pae_sy_n | active low almost empty flag output (sync to urclk) |
| pae_n | active low almost empty flag output (async) |
| paf_syn_n | active low almost full flag output (sync to uwclk) |
| paf_n | active low almost full flag output (async) |
| rs_n | active low master reset |
| rs | active high version of master reset |
| rt | active high re-transmit request |
| urclk | rising edge of read clock, independent of the state of any enable signals |
| uwclk | rising edge of write clock, independent of the state of any enable signals, | where "sync" is short for synchronized or synchronous and "async" is short for asynchronous, and where FLAG_rclk_n is the output of gates 178 (FIG. 6), 216 (FIG. 7), 256 (FIG. 8) and 284 (FIG. 9) and where FLAG_wclk_n is the output of gates 150 (FIG. 5), 176 (FIG. 6), 218 (FIG. 7) and 258 (FIG. 8), as will become clear from the following discussion.

Figure 4A:
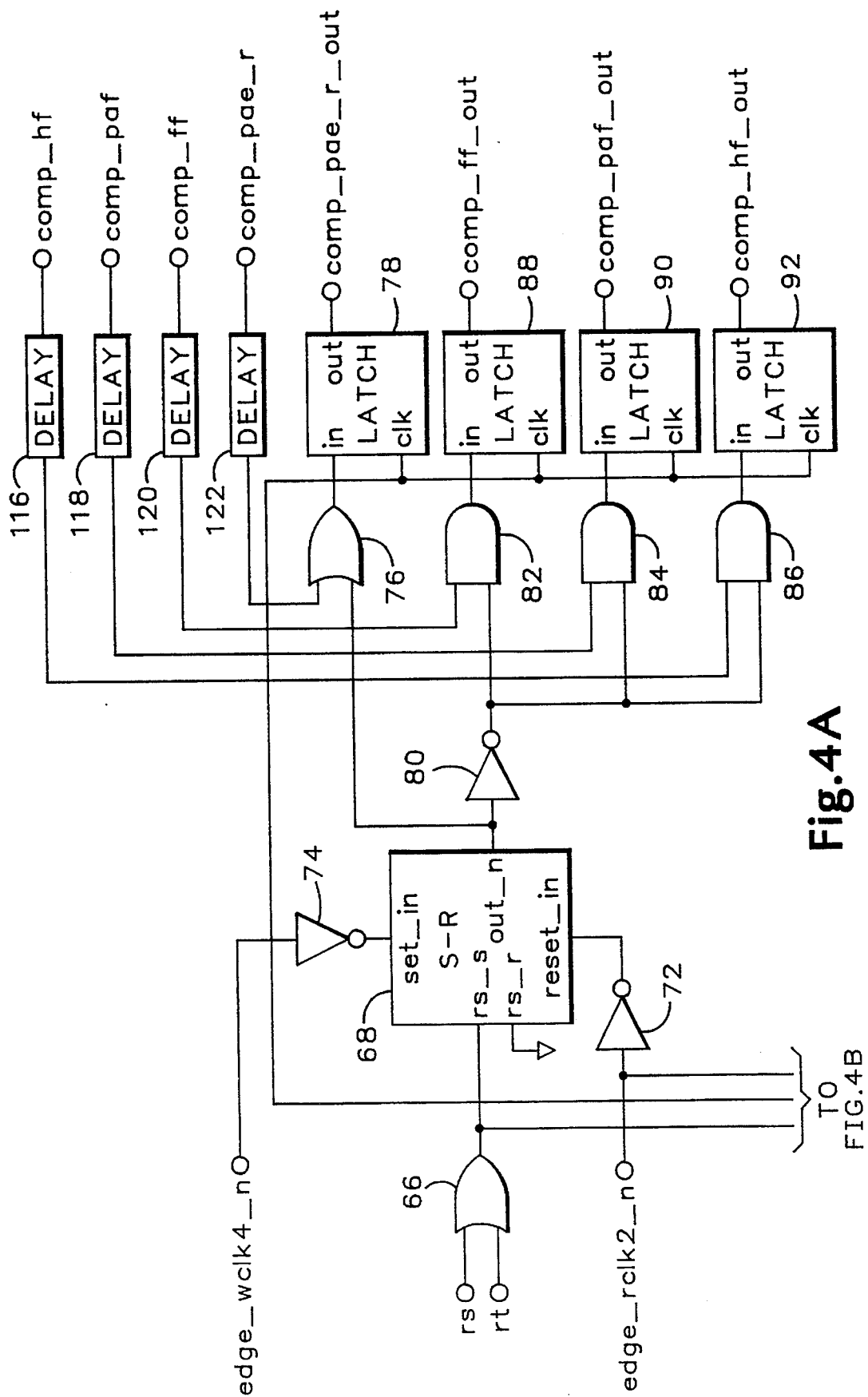
FIGS. 4A and 4B collectively are a detailed diagram of the glitch suppression logic of the apparatus of FIG. 1.
Figure 4B:
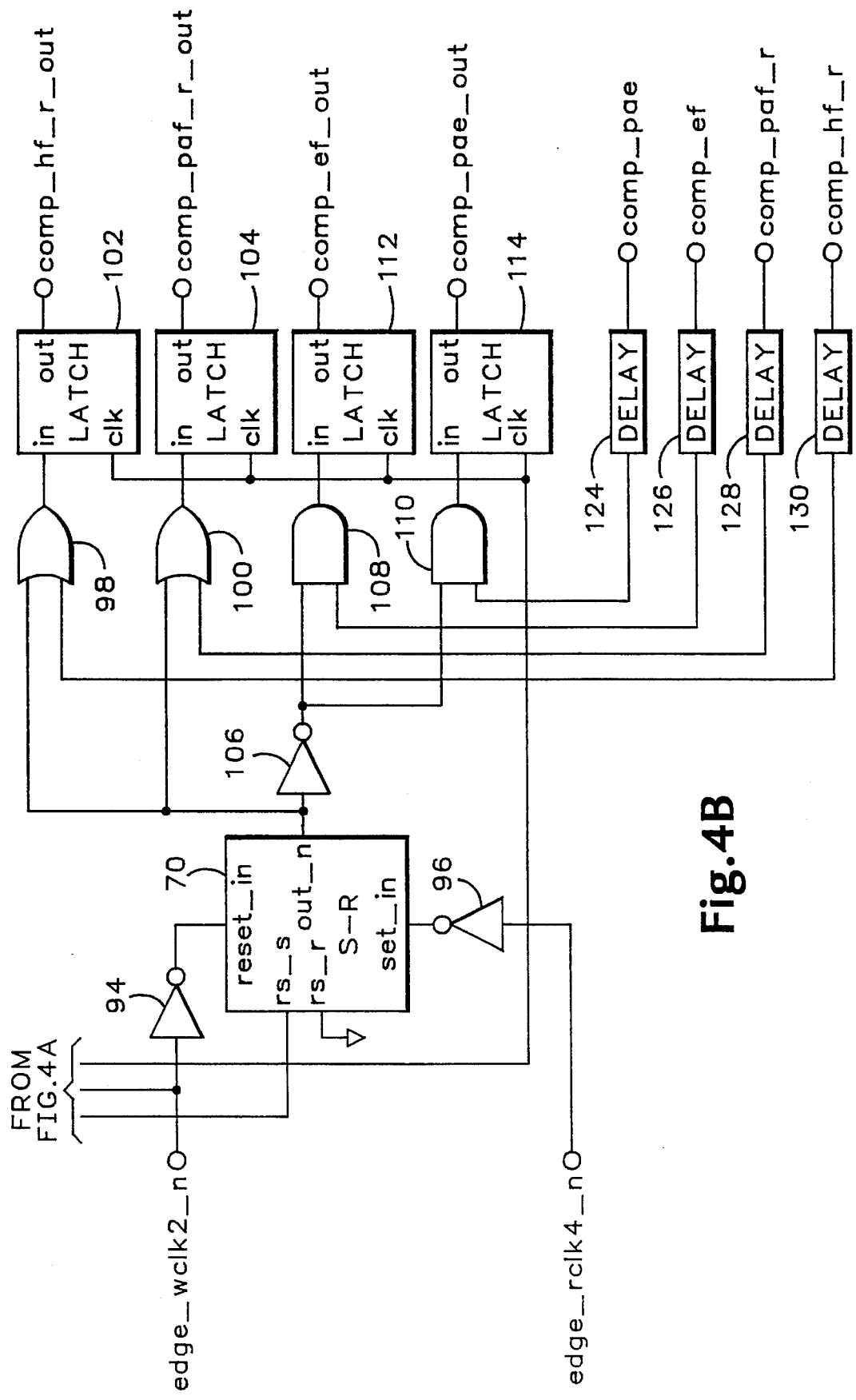

FIGS. 4A and 4B collectively illustrate, in more detail, the glitch-suppression logic or circuitry 24 shown in FIG. 1. Glitch-suppression logic 24 preferably includes an OR gate 66 that disjunctively combines rs and rt to produce a signal that becomes one of the set inputs (rs_s) of set-reset (S-R) flip-flops 68, 70. Those skilled in the art will appreciate that the behavior of all of the so-designated S-R flip flops in FIGS. 4A through 9 may be described by the following define statements:

$$\text{set\_in or rs\_s=1: out\_n=0} \qquad (1);$$

$$\text{reset\_in or rs\_r=1: out\_n=1} \qquad (2),$$

and that the set function has priority over the reset function in the event of concurrent, conflicting inputs.

Accordingly, the output (out_n) of flip-flop 68 is high (inactive) if edge_rclk2_n (inverted at 72) is low, and the output (out_n) of flip-flop 68 is low (active) if edge_wclk4_n (inverted at 74) is low or rs or rt is high. The output (out_n) may be seen to be ORd at 76 with comp_pae_r to determine the comp_pae_r_out output of LATCH 78. It also may be seen that the complement of the out_n output of flip-flop 68 (produced by inverter 80) may be seen to be ANDed at 82, 84, 86 with comp_ff, comp_paf and comp_hf to determine, respectively, the comp_ff_out, comp_paf_out and comp_hf_out outputs of LATCHes 88, 90 and 92. The LATCHes so-labelled in FIGS. 4A and 4B will be understood to behave in accordance with the following define statements:

$$\text{clk=1: out=in} \qquad (3);$$

$$\text{clk=0; out=latched version of in} \qquad (4),$$

i.e. the outputs of the LATCHes follow their inputs while the elk inputs are high and are latched upon positive→negative transitions of the elk inputs.

Referring still collectively to FIGS. 4A and 4B, it also may be seen that the output out_n of S-R flip-flop 70 is high (inactive) if edge_wclk2_n (inverted at 94) is low, and the output (out_n) of flip-flop 70 is low (active) if edge_rclk4_n (inverted at 96) is low or rs or rt is high. The output (out_n) may be seen to be ORd at 98 and 100 with comp_hf_r and comp_paf_r, respectively, to determine respectively the comp_hf_r_out and comp_paf_r_out outputs of LATCHes 102 and 104. It also may be seen that the complement of the out_n output of flip-flop 70 (produced by inverter 106) is ANDed at 108 and 110 with comp_ef and comp_pae to determine, respectively, the comp_ef_out and comp_pae_out outputs of LATCHes 112 and 114.

DELAYs 116, 118, 120, 122, 124, 126, 128, 130, 132 (see FIGS. 4A, 4B and 6) may be tapped to produce a delayed version of the corresponding inputs comp_hf, comp_paf, comp_ff, comp_pae_r, comp_pae, comp_ef, comp_paf_r, comp_hf_r, pae_n, as may be needed in a particular integrated circuit implementation. It is time critical that S-R flip-flops 68, 70 .(FIGS. 4A and 4B) generate outputs that can disable the inputs to latches 78, 88, 90, 92, 102, 104, 12, 114 before raw flag prediction signals arrive from the comparator. Thus, these delays may be needed to achieve the required timing by slowing down the raw flag prediction signals. Those of skill in the art will appreciate that in the preferred embodiment of the invention described and illustrated herein no delay is needed, but that such are shown for completeness of the disclosure. Such delays may be implemented in any known way and typically might be implemented as variable delays produced by altering a mask to tap a delay quantum of the desired number of nanoseconds (ns) or fractions thereof.

Figure 5:
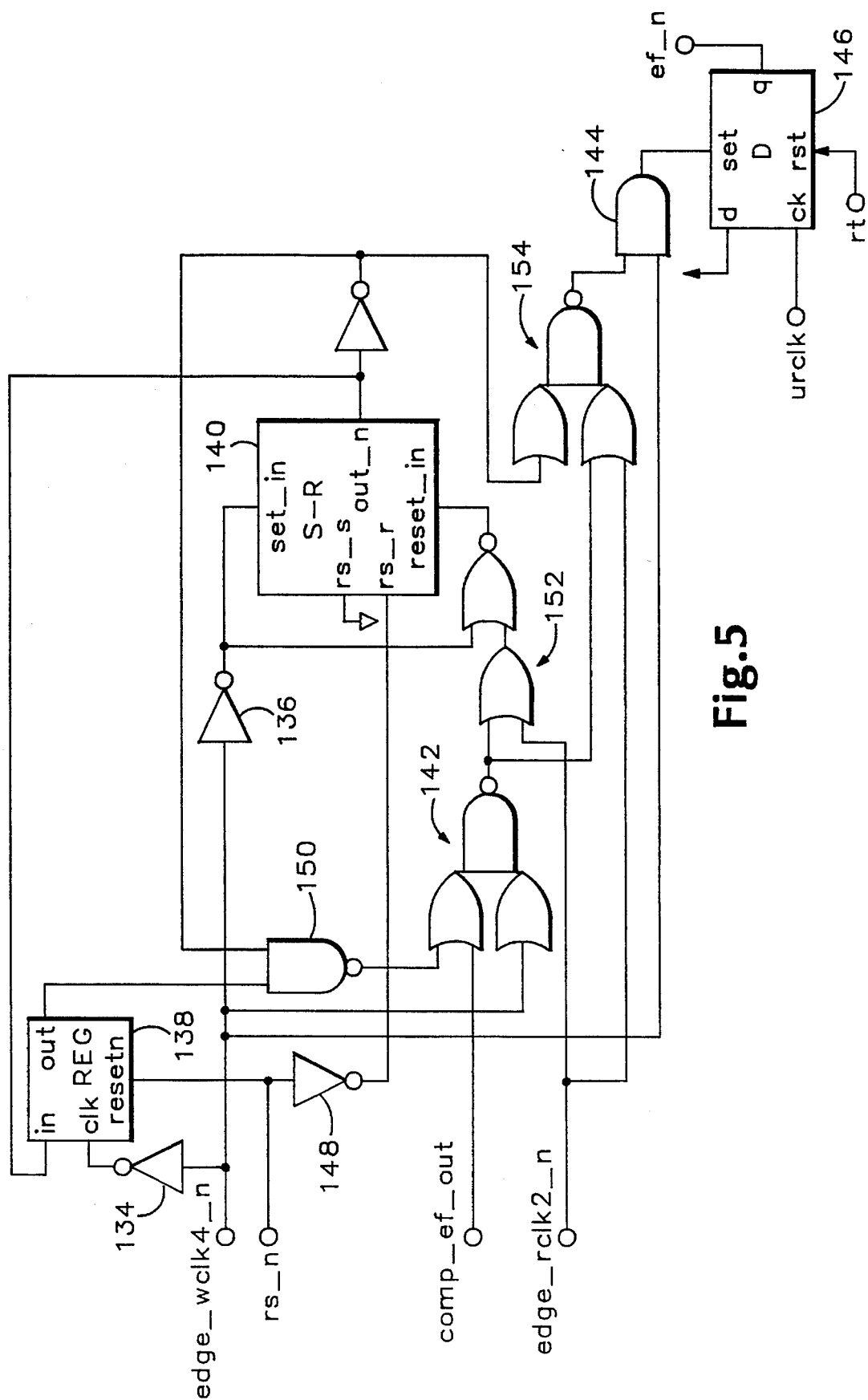
FIG. 5 is a detailed diagram of the empty flag logic of the apparatus of the invention.

Turning now to FIG. 5, it may be seen that edge_wclk_n inverted through inverters 134 and 136 respectively clocks a REGister 138 and sets an S-R flip-flop 140. REGisters so-labelled in FIG. 5 through 9 will be understood to behave in accordance with the following define statement:

$$\text{reset=1: out=0} \qquad (5).$$

edge_wclk4_n also is inputted to one OR gate of an OR/NAND gate indicated at 142. Finally, edge_wclk4_n is one input to an AND gate 144 that drives a D flip-flop 146. It will be understood that D flip-flop 146 behaves in accordance with the following define statements:

$$\text{rst=1: ef\_n=1} \qquad (6);$$

$$\text{set=1: ef\_n=0} \qquad (7).$$

The input (in) of REGister 138 is connected to the output (out_n) of S-R flip-flop 140, as shown. The low-active reset input (resetn) of REGister 138 is driven by rs_n, which is inverted via an inverter 148 to drive the rs_r input to S-R flip-flop 140, the rs_s input of which is grounded, as indicated. The low-active output (outf) of REGister 138 is input to a NAND gate 150, the other input of which is driven by the inverted (inverter 152) output (out_n) from S-R flip-flop 140. The other NAND input of NAND/OR gate 142 is comp_ef_out ORd with the output of NAND gate 150. The output of OR/NAND gate 142 is ORd at 152 with edge_rclk2_n and the output of OR gate 152 is NORd with the output of inverter 136 to drive the reset_in input of S-R flip-flop 140.

Referring still to FIG. 5, the inverted output of S-R flip-flop 140 becomes one input to the NAND gate of a second OR/NAND gate indicated at 154, the other input of which is the output of OR/NAND gate 142 ORd with edge_rclk2_n. The output of OR/NAND gate 154 is ANDed with edge_wclk4_n to become the set input to D flip-flop 146. The (d) input to D flip-flop 146 is tied high, as indicated by the upwardly directed arrow, and the clock input (ck) is driven by urclk. D flip-flop 146 is reset by rt. The output of S-R flip-flop 146 is ef_n, the empty flag indicator.

Figure 6:
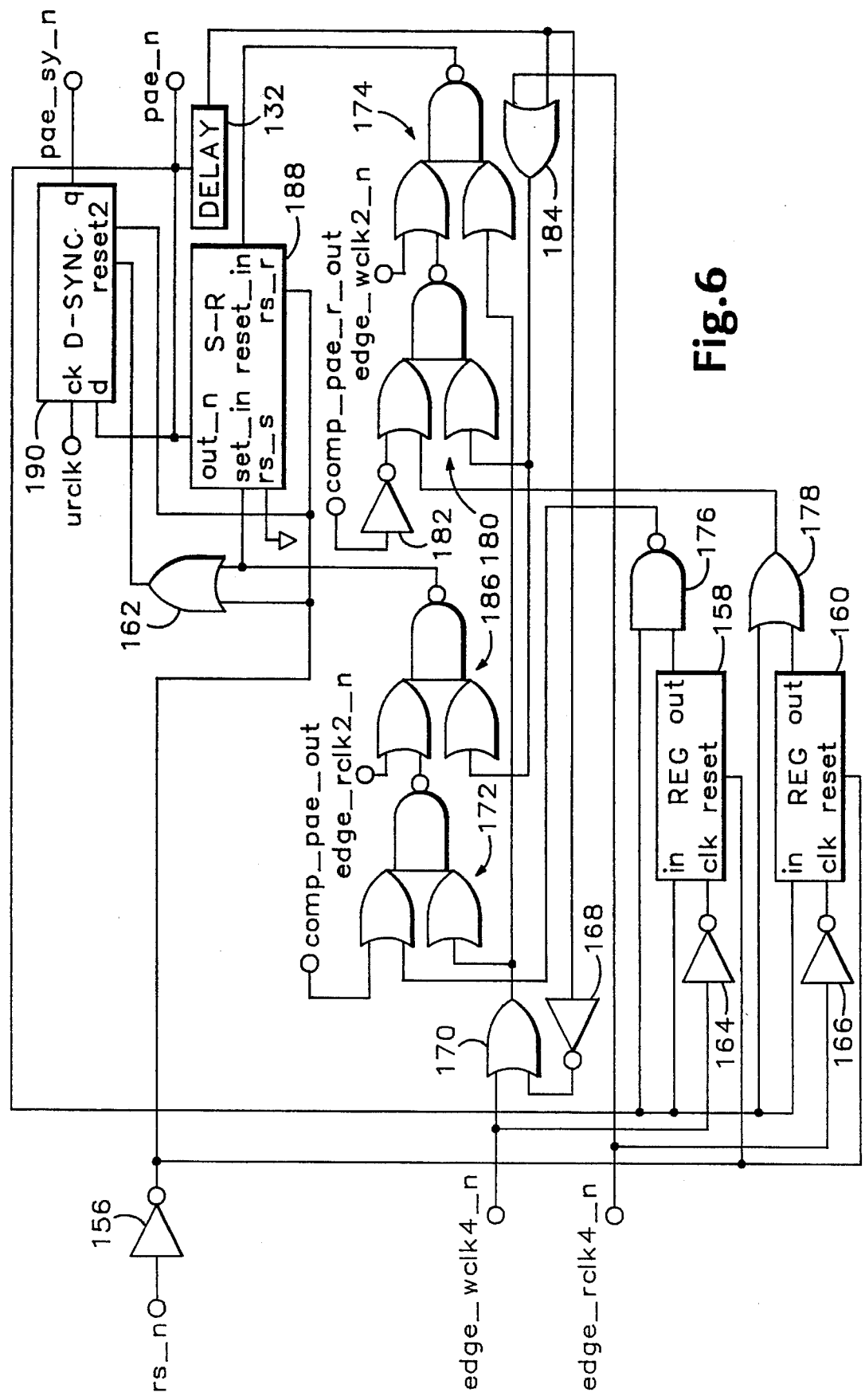
FIG. 6 is a detailed diagram of the almost empty flag logic.

Turning next to FIG. 6, rs_n may be seen to be inverted by inverter 156, the output of which is fed to the reset inputs of REGisters 158, 160 and to one input of an OR gate 162. REGisters 158, 160 are clocked (elk) by the outputs of inverters 164, 166 which invert, respectively, edge_wclk4_n and edge_rclk_n. The inputs to REGisters 158, 160 are both pae_n, as indicated, which signal is optionally delayed at DELAY 132, which optionally delayed signal is inverted at 168. The inverted version of pae_n is ORd at 170 with edge_wclk4_n and the OR gate output becomes a first input to the NAND gate of OR/NAND gates indicated at 172, 174. The output (out) of REGister 158 is NANDed at 176 with pae_n to produce a signal that becomes an OR gate input to the OR/NAND gate 172 the other OR gate input to which is comp_pae.

The output (out) of REGister 160 is ORd at 178 with pae_n to produce a signal that becomes a first OR gate input to an OR/NAND gate indicated at 180. The corresponding OR gate input to OR/NAND gate 180 is derived at 182 by inverting the comp_pae_r signal. The output of OR/NAND gate 180 is input, along with edge_wclk2_n, to the other OR gate input to OR/NAND gate 174. The output of optionally delayed pae_n is ORd at 184 with edge_rclk4_n and the OR gate output effectively is inputted to the other NAND gate of OR/NAND gate 180. The output of OR gate 184 also is inputted to the NAND gate of an OR/NAND gate indicated at 186. The other NAND gate input is the logical OR of the output of OR/NAND gate 172 and edge_rclk2_n.

The output of OR/NAND gate 186 used to set (set_in) an S-R flip-flop 188, which is reset (reset_in) by the signal output by OR/NAND gate 174 or which alternatively is reset (rs_r) by the inverted rs_n signal. The inverted rs_n signal output by inverter 156 is ORd at 162 with the output of OR/NAND gate 186, as shown, to produce one of two reset inputs (reset) to a two-stage D-synchronizer (D-SYNC) 190. The other reset input (reset) to D-SYNC 190 is simply rs_n inverted at 156. So-labelled D-SYNCs in FIGS. 6 through 9 will be understood to behave in accordance with the following define statement:

reset=1; q=0         (8).

The set input (rs_s) of S-R flip-flop 188 is tied low, as indicated, and its output (out_n) is pae_n, described immediately above. pae_n also is the (d) input to D-SYNC 190, which is clocked (ck) by urclk. The output of D-SYNC 190 is pae_sy_n, the low-active, synchronized almost empty flag output of invented apparatus 10.

Figure 7:
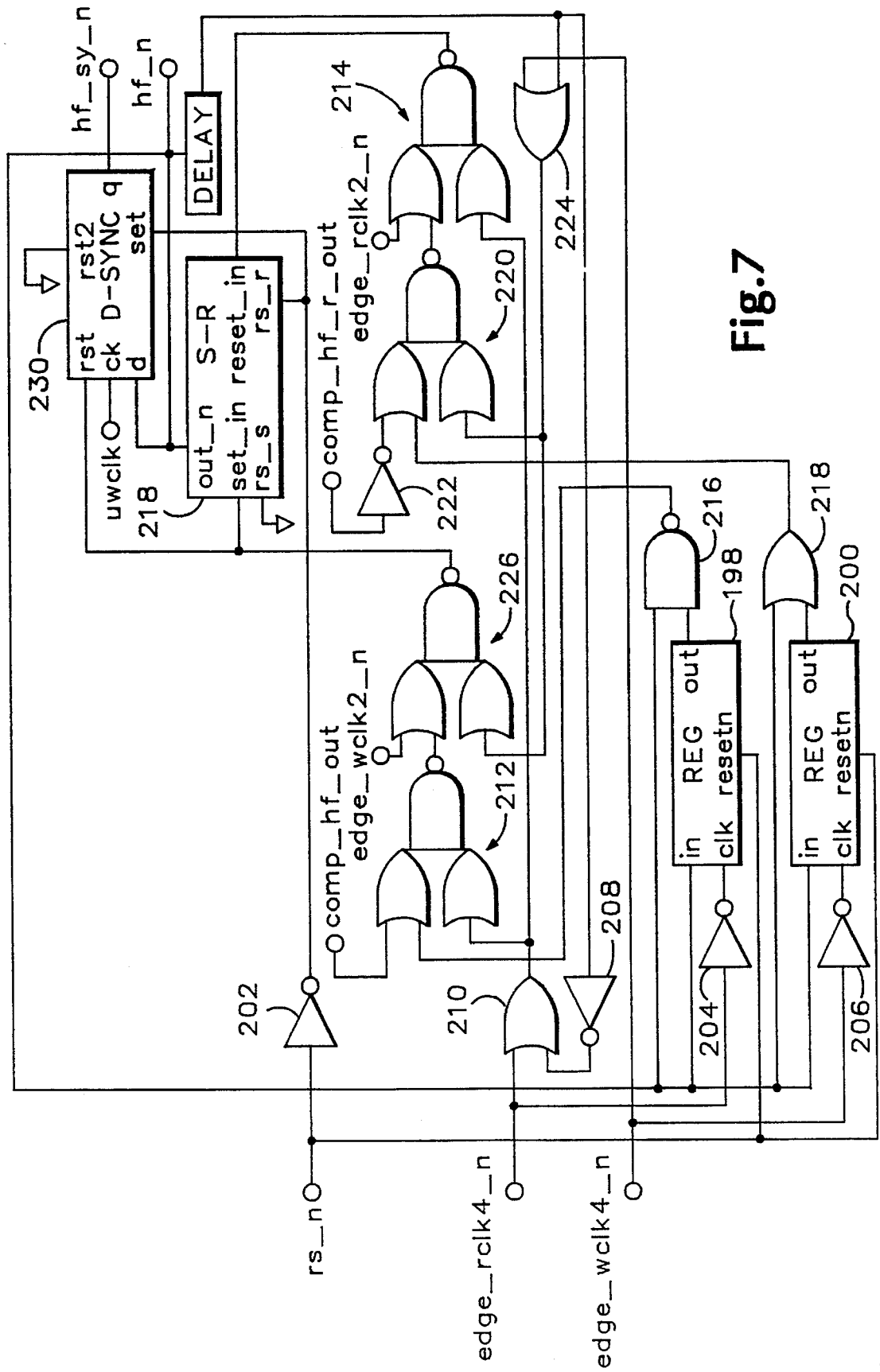
FIG. 7 is a detailed diagram of the half full flag logic.
Figure 8:
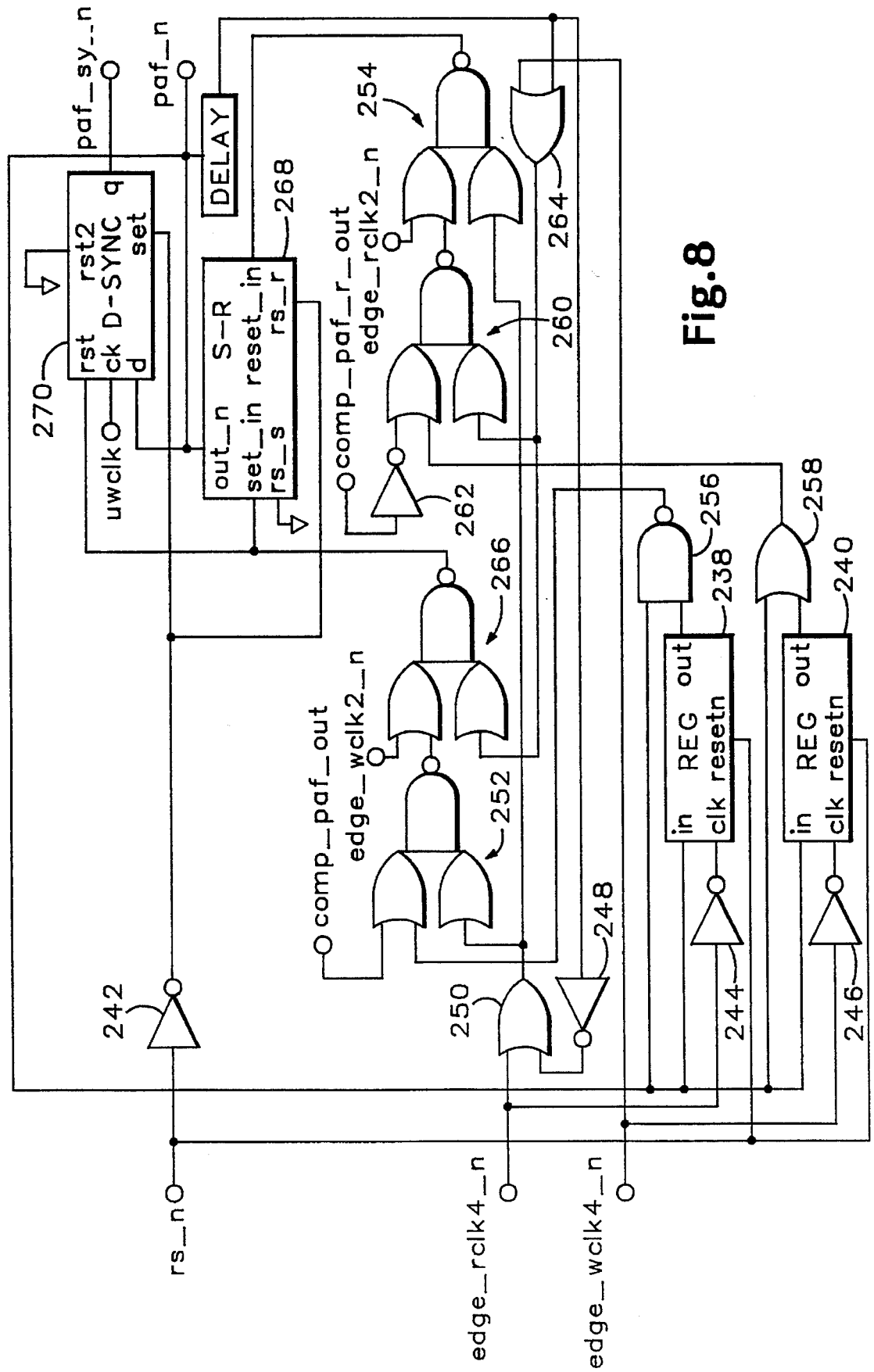
FIG. 8 is a detailed diagram of the almost full flag logic.

Referring briefly and collectively to FIGS. 7 and 8, those of skill in the arts will appreciate that there are significant topologic similarities among the half empty flag generation logic illustrated in FIG. 6 and described immediately above, the full status flag generation logic illustrated in FIG. 7 and the almost full flag generation logic illustrated in FIG. 8. These topological similarities will be appreciated to be a result of the fact that the requirements of such logic are similar in that all require an understanding of the asserted and de-asserted predictive possibilities based upon write and read pointer differences, impending asynchronous read and/or write clock activity and synchronization with a defined read or write clock edge.

Referring specifically now to FIG. 7, rs_n may be seen to be fed to the reset inputs (resetn) of REGisters 198, 200 and to be inverted at 202. REGisters 198, 200 are clocked (clk) by the outputs of inverters 204, 206 which invert, respectively, edge_rclk4_n and edge_wclk4_n (which clocking will be appreciated to be the opposite of that of corresponding REGisters 158, 160 of FIG: 6). The inputs (in) to REGisters 198, 200 are both hf_n, as indicated, which signal is optionally DELAYed as shown and as understood, which optionally delayed signal is inverted at 208. The inverted version of hf_n is ORd at 210 with edge_rclk4_n and the OR gate output becomes a first input to the NAND gate of OR/NAND gates indicated at 212, 214. The output (out) of REGister 198 is NANDed at 216 with hf_n to produce a signal that becomes an OR gate input to the OR/NAND gate 212, the other OR gate input to which is comp_hf.

The output (out) of REGister 200 is ORd at 218 with hf_n to produce a signal that becomes a first OR gate input to an OR/NAND gate indicated at 220. The corresponding OR gate input to OR/NAND gate 220 is derived at 222 by inverting the comp_hf_r signal. The output of OR/NAND gate 220 is inputted, along with edger_clk2_n (contrast corresponding edge_wclk2_n input of FIG. 6), to the other OR gate input to OR/NAND gate 214. The output of optionally delayed hf_n is ORd at 224 with edge_wclk4_n (contrast the corresponding edge_rclk4_n signal used in FIG. 6) and the OR gate output effectively is input to the other NAND gate of OR/NAND gate 220. The output of OR gate 224 also effectively is input to the NAND gate of an OR/NAND gate indicated at 226. The other NAND gate input is the logical OR of the output of OR/NAND gate 212 and edge_wclk2_n (contrast the corresponding edge_rclk2_n OR input in FIG. 6).

The output of OR/NAND gate 216 used to set (set_in) an S-R flip-flop 218, which is reset (reset_in) by the signal output by OR/NAND gate 214 or which alternatively is reset (rs_r) by the inverted rs_n signal. The inverted rs_n signal outputted by inverter 202 also is used to set a D-SYNC 230. One reset (rst) input to D-SYNC 230 is the output of OR/NAND gate 216, and the other reset input (rst2) to D-SYNC 230 is simply tied low. The reset input (rs_s) of S-R flip-flop 218 is tied low, as indicated, and its output (out_n) is hf_n, described immediately above. hf_n also is the (d) input to D-SYNC 230, which is docked (ck) by uwclk (contrast the corresponding urclk clock input of FIG. 6). The output of D-SYNC 230 is hf_sy_n, the low-active, synchronized half full flag output of invented apparatus 10.

Turning next to FIG. 8, rs_n may be seen to be fed to the reset inputs (resetn) of REGisters 238, 240 and to be inverted at 242. REGisters 238, 240 are clocked (elk) by the outputs of inverters 244, 246 which invert, respectively, edge_rclk4_n and edge_wclk4_n. The inputs (in) to REGisters 238, 240 are both paf_n, as indicated, which signal is optionally DELAYed as shown and as understood, which optionally delayed signal is inverted at 248. The inverted version of paf_n is ORd at 250 with edge_rclk4_n and the OR gate output becomes a first input to the NAND gate of OR/NAND gates indicated at 252, 254. The output (out) of REGister 238 is NANDed at 256 with paf_n to produce a signal that becomes an OR gate input to the OR/NAND gate 252 the other OR gate input to which is comp_paf.

The output (out) of REGister 240 is ORd at 258 with paf_n to produce a signal that becomes a first OR gate input to an OR/NAND gate indicated at 260. The corresponding OR gate input to OR/NAND gate 260 is derived at 262 by inverting the comp_paf_r signal. The output of OR/NAND gate 260 is input, along with edge_rclk2_n, to the other OR gate input to OR/NAND gate 254. The output of optionally delayed paf_n is ORd at 264 with edge_wclk4_n and the OR gate output effectively is inputted to the other NAND gate of OR/NAND gate 260. The output of OR gate 264 also effectively is input to the NAND gate of an OR/NAND gate indicated at 266. The other NAND gate input is the logical OR of the output of OR/NAND gate 252 and edge_wclk2_n.

The output of OR/NAND gate 266 used to set (set_in) an S-R flip-flop 268, which is reset (reset_in) by the signal output by OR/NAND gate 254 or which alternatively is reset (rs_r) by the inverted rs_n signal. The inverted rs_n signal output by inverter 242 also is used to set a D-SYNC 270. One reset (rst) input to D-SYNC 270 is the output of OR/NAND gate 256, and the other reset input (rst2) to D-SYNC 270 is simply tied low. The reset input (rs_s) of S-R flip-flop 268 is tied low, as indicated, and its output (out_n) is paf_n, described immediately above. pafn also is the (d) input to D-SYNC 270, which is clocked (ck) by uwclk. The output of D-SYNC 270 is paf_sy_n, the low-active, synchronized almost full flag output of invented apparatus 10.

Figure 9:
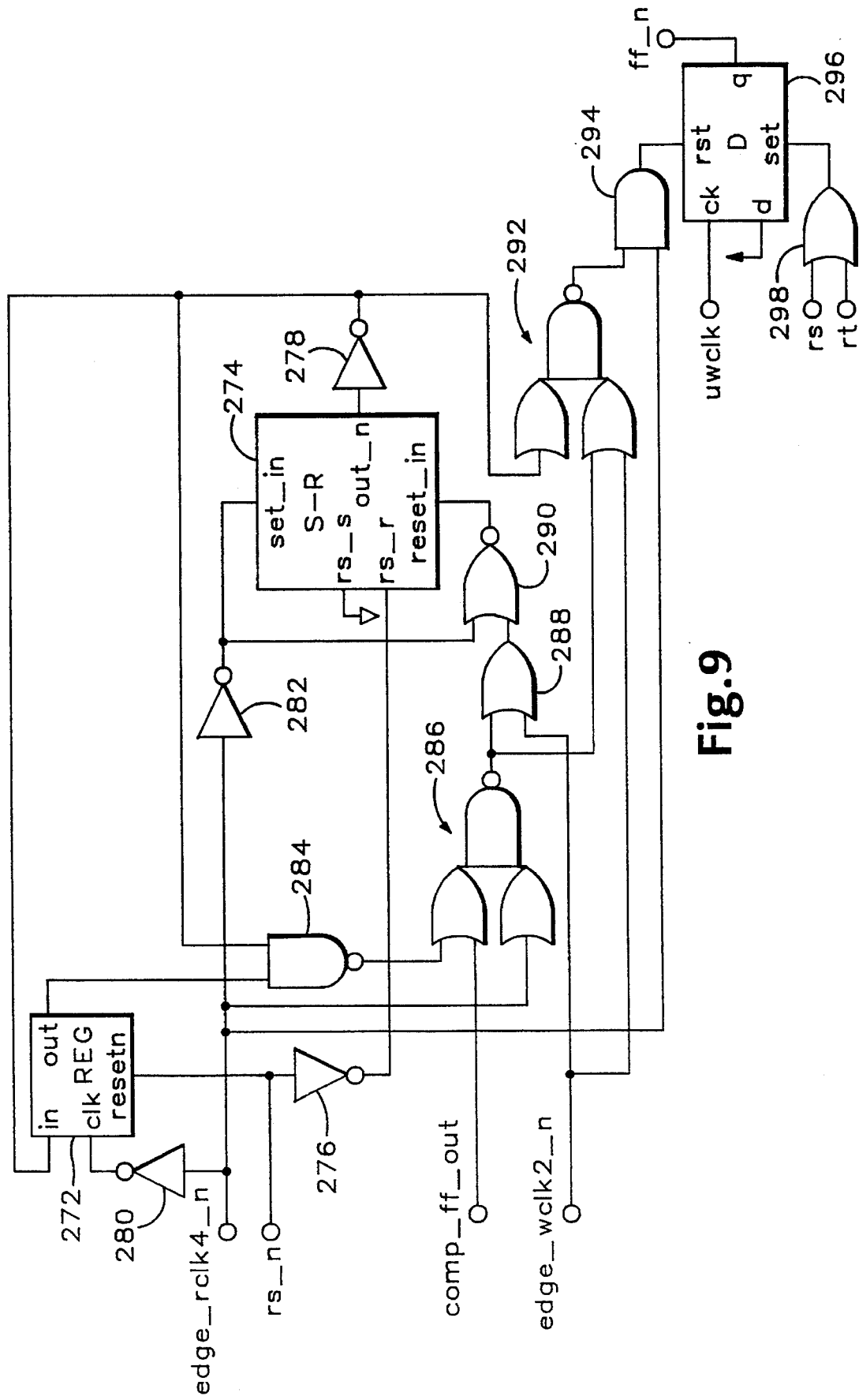
FIG. 9 is a detailed schematic diagram of the full flag logic of the apparatus of FIG. 1.

Referring finally to FIG. 9, the full flag logic of apparatus 10 made in accordance with a preferred embodiment of the invention will be described. A REGister 272 is reset (resetn) upon the (low-active) assertion of rs_n, and an S-R flip-flop 274 is reset (rs_r) upon the de-assertion thereof, via an inverter 276. The output (outn) of S-R flip-flop 274 is inverted at 278 and the inverted output is fed back to the input (in) of REGister 272. REGister 272 is docked by edge_rclk_n, as such is inverted via an inverter 280. With one of its set inputs (rs_s) being tied low, as indicated, S-R flip-flop 274 is set at its set_in input terminal by edge_rclk_n, as such is inverted via another inverter 282. Those of skill in the art will appreciate that, within the spirit and scope of the invention, duplicate inverter functions such as those of inverters 280 and 282 may be combined, such that edge_rclk_n need be inverted only once and fanned out to all receiving gates such as REGister 272 and S-R flip-flop 274. Those skilled in the art will appreciate that such combinations have possibly adverse timing and fanout impacts that would have to be comprehended in order to accomplish the important timing requirements of the present invention.

The output of inverter 278 is NANDed at 284 with the output (out) of REGister 272 to produce one input to a first OR gate of an OR/NAND gate indicated at 286. The other input of such first OR gate is comp_ff, as shown. The second OR gate of OR/NAND gate 286 has only edge_rclk_n as its input. The output of OR/NAND gate 286 is ORd at 288 with edge_wclk2_n and input along with the output of inverter 282 to a NOR gate 290 the output of which resets (reset_in) S-R flip-flop 274. The output of inverter 278 also is the sole input to an OR gate of an OR/NAND gate indicated at 292 the other OR gate of which ORs the output of OR/NAND gate 286 and edge_wclk2_n.

The output of OR/NAND gate 292 is ANDed at 294 with edge_rclk_n to produce a signal connected to the reset (rst) input of a D flip-flop 296. The (d) input of D flip flop 296 is tied high, as shown, and the flip-flop is clocked by uwclk such that the ff_n output will transition only in synchronous response to a FIFO write command. D flip-flop 296 initially is set (thus de-asserting low-active output if-n) upon the occurrence of either rs (master reset) or rt (retransmit), as they are ORd at 298. Accordingly, if a FIFO full pending status is indicated and a write clock occurs without an intervening read clock, then the FIFO full flag is asserted with the leading edge of such a write clock.

The preferred method of the invention now may be understood, in view of the invented apparatus. For use in connection with a first-in first-out memory device (FIFO) having read and write address pointers capable of asynchronous indexing, the invented status flag generation method preferably includes 1) determining an indexed distance between the read and write address pointers, e.g. via read clock 12a, write clock 12b, read counter 14a, write counter 14b, read pointer 16a, write pointer 16b and comparator 18; 2) comparing such distance with predefined criteria for predicting a status condition of the memory device, e.g. also via comparator 18; 3) producing a corresponding predicted status signal for passage through circuitry, e.g. glitch suppression circuitry 24, which suppresses transient predicted status signals; and after suppression of transient status signals, 4) passing the predicted status signal to a state machine, e.g. asynchronous state machine 26, for output as a status flag in synchronous relation to a defined time base such as one of the read and write clock signals, the defined time base corresponding to the indexing of a selected one of the read and write address pointers.

It will be appreciated that the distance between the read and write address pointer represents the quantitative content of the memory device, such content being compared with predefined criteria which represent a quantitative content of the memory device at which point a status flag is to change, as described above. Preferably, the predefined criteria represent a memory content which is a predetermined distance, e.g. one, as described above for the half full status flag, from the quantitative content at which a status flag is to change. In other words, the predefined criteria preferably represent an address count which is one address away from an address count at which a status flag is to change.

It will be appreciated that the address count at which a flag is to change, in accordance with the preferred method, is approachable to increment only from both above and below, with the predefined criteria representing a difference from the address count of a predetermined amount. Of course, such a status flag output is changed in synchronous relation to a defined time base, provided that a second time base is not pulsed. In other words, such status flag output changes are conditioned upon the occurrence of a pulse in a defined time base, e.g. the write clock, and upon the non-occurrence of an intervening pulse in a second time base, e.g. the read clock, as described in detail above by reference to the preferred embodiment of apparatus 10 and the exemplary half full status flag.

An alternative way of describing the preferred method of the invention follows. For use in the generation of a status flag in a first-in first-out memory device which includes a read address pointer indexed by a read clock and a write address pointer indexed by a write clock, such alternative preferred method includes 1) comparing the read address pointer to the write address pointer to determine an address count representing the quantitative content of the memory device, e.g. via. read counter 14a, write counter 14b, read pointer 16a, write pointer 16b and comparator 18; and where the status flag is inactive, 2) comparing the address count with a predefined assertion predictor value, equality of the assertion predictor value and the address count predicting status flag assertion upon a chosen subsequent pulse of a first predetermined clock, e.g. also via comparator 18.

The alternative preferred method preferably further includes upon predicting assertion of the status flag, 3) producing a status flag assertion signal for passage through circuitry, e.g. glitch suppression circuitry 24, which suppresses transient assertion status signals to a state machine, e.g. asynchronous state machine 26, for assertion of the status flag synchronously with the first predetermined clock; where the status flag is active, similarly 4) comparing the address count with a predefined de-assertion predictor value, equality of the de-assertion predictor value and the address count predicting status flag de-assertion upon a chosen subsequent pulse of a second predetermined clock; and upon predicting de-assertion of the status flag, 5) producing a status flag de-assertion signal for passage through circuitry which suppresses transient de-assertion status signals to a state machine for de-assertion of the status flag synchronously with the second predetermined clock.

Preferably, the distance between the read and write address point represents the quantitative content of the memory device, such content being compared with predefined criteria which represent a quantitative content of the memory device at which point a status flag is to change. More preferably, the predefined criteria represents a memory content which is a predetermined distance from the quantitative content at which a status flag is to change, as described in detail above with reference to apparatus 10 in its preferred embodiment.

Those of skill in the art will appreciate that markedly improved dynamic resolution is achieved by the present invention, yet at reasonable cost. Such is accomplished, in accordance with invention, by providing look-ahead logic that generates write or read clock synchronized FIFO flag output signals based upon early and glitch-free input predictor signals. Flag access times are reduced by a factor of two or three over conventional apparatus, and false indications of a FIFO's internal status are avoided altogether. Those of skill in the art will appreciate that the detailed circuit diagrams provided herein are believed amply to illustrate a workable embodiment that takes account of important timing and fanout considerations of IC implementations. Still, alternative circuit topologies, device types, schematic layouts and gate timings are contemplated and are within the spirit and scope of the invention.

Accordingly, while the present invention has been shown and described with reference to the foregoing preferred method and apparatus, it will be apparent to those skilled in the art that other changes in form and detail may be made therein without departing from the spirit and scope of the invention as defined in the appended claims.

We claim:

1. In a first-in first-out memory device (FIFO) which includes read and write address pointers, wherein the read address pointer is indexed synchronously with a read clock signal and the write address pointer is indexed synchronously with a write clock signal, such read and write clock signals being asynchronously pulsed relative to one another, a status flag generation apparatus comprising:

a comparator which relates the read and write address pointers to identify a difference therebetween, compares such difference with predefined criteria to predict a status condition of the memory device, and produces a corresponding predicted status signal thereupon;

glitch suppression circuitry coupled with said comparator for suppressing transient predicted status signals produced by said comparator so as to provide predicted status signals which are glitch-free; and a state machine coupled with said glitch suppression circuitry to accept said glitch-free predicted status signals and selectively to produce a corresponding status flag synchronously with a predetermined one of the clock signals, said state machine determining the next state of the corresponding status flag based upon the glitch-free predicted status signals and upon the relative timing of such read and write clock signals.

2. The apparatus of claim 1, wherein the address pointers are indexed via a counter which increments the read address pointer with each read clock pulse and increments the write address pointer with each write clock pulse.

3. The apparatus of claim 1, wherein the difference between the read and write address pointers denotes a count of addresses in use by the memory device.

4. The apparatus of claim 3, wherein the predefined criteria includes a transition value which corresponds to an address count of the memory device which denotes a predetermined status condition change.

5. The apparatus of claim 4, wherein a change in status condition is predicted when the address count of the memory device differs from the transition value by a predetermined amount.

6. The apparatus of claim 5, wherein the predetermined amount is one.

7. The apparatus of claim 4, wherein a change in the status condition of the FIFO occurs when the FIFO is half full.

8. The apparatus of claim 4, wherein a change in a status condition of the FIFO occurs when the FIFO contains an operator-defined address count.

9. For use in connection with a first-in first-out memory device (FIFO) having read and write address pointers capable of asynchronous indexing, a status flag generation method which comprises:

determining an indexed distance between the read and write address pointers;

comparing such distance with predefined criteria for predicting a status condition of the memory device;

producing a corresponding predicted status signal for passage through circuitry which suppresses transient predicted status signals; and after suppression of transient predicted status signals, passing the predicted status signal to a state machine for output as a status flag in synchronous relation to a defined time base.

10. The method of claim 9, wherein the distance between the read and write address point represents the quantitative content of the memory device, such content being compared with predefined criteria which represent a quantitative content of the memory device at which point a status flag is to change.

11. The method of claim 10, wherein the predefined criteria represent a memory content which is a predetermined distance from the quantitative content at which a status flag is to change.

12. The method of claim 10, wherein the predefined criteria represent an address count which is one address away from an address count at which a status flag is to change.

13. The method of claim 12, wherein the address count at which a flag is to change is approachable from both above and below by incrementing an address pointer, the predefined criteria representing a difference between the address count and the address pointer of a predetermined amount.

14. The method of claim 9, wherein the defined time base corresponds to the indexing of a selected one of the read and write address pointers.

15. The method of claim 9, wherein a status flag output is changed in synchronous relation to a defined time base if and only if by then a second time base has not been pulsed.

16. The method of claim 9, wherein the status flag is a half full flag.

17. For use in the generation of a status flag in a first-in first-out memory device which includes a read address pointer indexed by a read clock and a write address pointer indexed by a write clock, a method which comprises:

comparing the read address pointer to the write address pointer to determine an address count representing the quantitative content of the memory device;

where the status flag is inactive, comparing the address count with a predefined assertion predictor value, equality of the assertion predictor value and the address count predicting status flag assertion upon a chosen subsequent pulse of a first predetermined clock;

upon predicting assertion of the status flag, producing a status flag assertion signal for passage through circuitry which suppresses transient assertion status signals to a state machine for assertion of the status flag synchronously with the first predetermined clock;

where the status flag is active, comparing the address count with a predefined de-assertion predictor value, equality of the de-assertion predictor value and the address count predicting status flag de-assertion upon a chosen subsequent pulse of a second predetermined clock;

upon predicting de-assertion of the status flag, producing a status flag de-assertion signal for passage through circuitry which suppresses transient de-assertion status signals to a state machine for de-assertion of the status flag synchronously with the second predetermined clock.

18. The method of claim 17, wherein the distance between the read and write address pointers represents the quantitative content of the memory device, such content being compared with predefined criteria which represent a quantitative content of the memory device at which point a status flag is to change.

19. The method of claim 17, wherein the predefined criteria represents a memory content which is a predetermined distance from the quantitative content at which a status flag is to change.

* * * * *